UNITED STATES PATENT OFFICE.

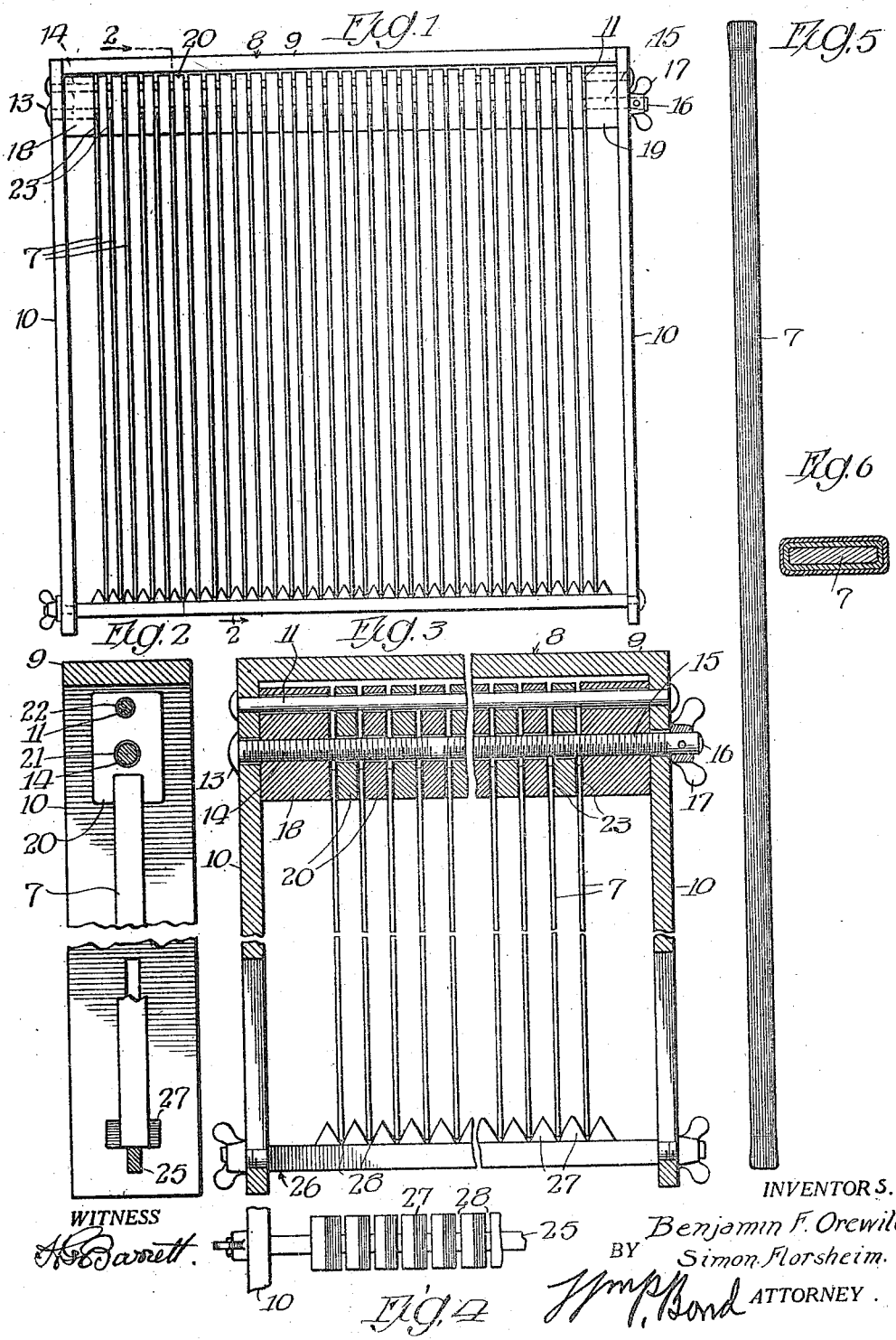

SIMON FLORSHEIM AND BENJAMIN F. OREWILER, OF CHICAGO, ILLINOIS, ASSIGNORS TO KABO CORSET CO., OF CHICAGO, ILLINOIS, A CORPORATION OF WEST VIRGINIA.

HOLDER FOR CORSET-STEELS.

1,231,246.

Specification of Letters Patent.   Patented June 26, 1917.

Application filed July 15, 1916.   Serial No. 109,562.

*To all whom it may concern:*

Be it known that we, SIMON FLORSHEIM and BENJAMIN F. OREWILER, both citizens of the United States, residing at Chicago, in the county of Cook and State of Illinois, have invented certain new and useful Improvements in Holders for Corset-Steels, of which the following is a specification.

The present invention relates to a holder for corset steels used in applying to their outer surface a coating of rust-proof material.

The principal object of the invention is to provide means for enabling a coating or covering of rust-proof material to be placed on the outer surface of a steel corset stay in a manner whereby said covering is placed upon the stay in a thin layer and in an even and smooth manner, and the scraping off of the material from the stay prior to its being baked and hardened is eliminated.

A further object of the invention is to hold the stays while the coating is being applied so as not to allow the stays to touch one another and to permit the covering solution to drain from the stays, and further to so hold the stays as to enable the covering solution to cover all parts except the tip ends.

The invention further consists in the features of construction and combination of parts hereinafter described and claimed.

In the drawings:

Figure 1 is a front view, showing the holder of the present invention, with a plurality of stays held therein;

Fig. 2, a cross section, on an enlarged scale, on line 2—2 of Fig. 1, looking in the direction of the arrow;

Fig. 3, a detail section, on an enlarged scale, of the upper portion of the apparatus shown in Fig. 1;

Fig. 4, a detail plan view of the member for supporting and holding the lower ends of the stays;

Fig. 5, a view of a covered stay; and

Fig. 6, a section on an enlarged scale through said covered stay.

In the application of a rust-proof covering to corset steels, it is desirable to apply the substance forming said covering in the nature of a thin coat over the steel, and then to subject it to a baking action. In order to apply the covering in this manner and obtain a satisfactory finished product, the stay should be moved in and out of the solution with a straight-line movement and coated at one dipping operation; and after the stays are removed from the solution, they should be allowed to drain, in order that the surplus material may run off and the applied coating made smooth and regular.

In practice, after the stays are immersed in the covering solution, it is necessary to transport them to a baking oven without disturbing the relation they were in when dipped in the solution, as otherwise the coating, which is in a soft condition, would be wiped off, leaving the covering imperfect. Therefore, the stays should not be touched prior to the coating becoming hard through the baking process, and if one of the stays, prior to being baked and hardened, is allowed to touch the other, or come in contact with any surface whatsoever except at their extreme tip ends, an imperfect covering will be produced.

Therefore, the main objects of the invention are to so hold the stays during the dipping process as to allow the covering to be placed upon the stay in the form of a thin, even coat, and the stays baked without in any way allowing the coating to be mutilated.

Referring now to the drawings, and particularly to Fig. 1, the holder shown comprises a frame 8, consisting of a top rail 9 and depending side rails 10. Affixed to the side rails 10, at the upper end thereof, is a rod 11, and directly below this rod is positioned a second rod 12, which, as shown, is of somewhat larger diameter. This second rod is mounted within the rails 10 to permit its having a turning movement therein. On one end of the rod 12 is formed a head 13, and this same end of the rod is provided with a right hand threaded surface 14. The opposite end 16 of the rod 12 is provided with a left hand threaded surface 15; and this end 16 extends beyond the rails 10 and has fixedly secured thereto a finger member 17 for rotating the rod.

End blocks 18 and 19 are provided, the block 18 having a threaded opening 18ª engaging with the threaded surface 14, and the block 19 having a threaded opening 19ª engaging with the threaded surface 15; and each of the blocks 18 and 19 is provided with smooth openings 19ᵇ, allowing them to travel upon the rods 11. It will be apparent that when the finger-piece 17 is manipulated, it will rotate the rod 12; and by the right and left hand threaded surfaces on said rod will cause the blocks 18 and 19 associated therewith to be simultaneously moved toward one another, said blocks being held against rotative movement with the rod by reason of their being mounted on the rod 11, and will therefore move bodily along the rods 11 and 12.

Interposed between these blocks 18 and 19 is a series of clamping plates 20, each of which is formed with an opening 21, through which passes, with a sliding fit, the rod 12, and with an opening 22, through which passes, with a sliding fit, the rod 11, thereby allowing the plates 20 to slide along the rods 11 and 12, but preventing any turning movement of said plates. The stays 7 are inserted between adjacent plates 20, as will be apparent from Fig. 1, and then upon manipulation of the finger-piece 17, the blocks 18 and 19 are actuatd, forcing the plates 20 toward one another so as to clamp one tip end 23 of a stay between adjacent plates. The opposite tip end 24 of each stay rests upon a narrow rail 25 formed on a member 26 positioned at the lower end of the frame; and extending up from this rail 25 are a plurality of V-shaped lugs 27 in the construction shown.

A slot 26ª is formed in the rail 10, in which slot the member 26 slides; and suitable locking means 26ᵇ are provided for holding the member 26 in adjusted position within said slot, whereby the distance between the member 26 and the upper stay clamping means may be varied to allow the clamp to accommodate different lengths of stays.

It will be apparent that with the tip end 23 of the stay clamped by the plates 20 and the opposite tip end 24 of each stay resting between the lugs 27 and upon the rail 25, the stays are all held in spaced relation to one another within the clamp, and in a manner whereby movement of the ends of the stays so as to cause the body of the stays to contact one another, or to contact another surface, and thus have the covering mutilated previous its being hardened, is prevented.

Should there be any slight movement of the end 24 of the stays, such movement would only bring the extreme tip of the stay into contact with the face of a lug or lugs 27, owing to their beveled formation. Both of the tip ends 23 and 24 of the stays are, after the water-proofing composition has been applied and hardened, dipped into a celluloid solution to form a tip covering therefor, or a metal tip is placed thereon. Hence, the clamping of one end of the stay and the resting of the other tip end on the bar 25 are not in any way detrimental to the proper placing of the water-proof coating on the stay body, since it makes no difference, as far as properly coating the stay is concerned, whether or not the tip ends are fully covered, because of the subsequent application thereto of the celluloid composition.

It will be noticed that the rail 25 is considerably narrower than the lugs 27, leaving slots or openings 28 upon each side of the rail 25 and between the lugs 27. After the stays have been placed within the clamp in the manner above described, the entire clamp is lowered with a straight-line movement into a tank of coating composition, and is withdrawn from such straight-line movement, so that the coating is placed over the entire surface of the stay by this single up and down movement thereof. This allows of a uniform spreading of the coating.

With the use of the present holder, when the stay is withdrawn from the liquid, there is a uniform and even coat placed thereon. After being withdrawn, the clamp with the coated stays thereon is left suspended above the tank of liquid for a period of time in order to allow the surplus liquid to drain from the stays; and the surplus liquid so drained off will pass into the tank through the openings or slots 28 of the member 26. This allows a thin, even coating to be placed upon the stay, and, moreover, causes the coating so applied to have a smooth and regular appearance. After being drained, the clamp with the stays thereon is placed in an oven and subjected to a baking operation, and a covering 29 formed thereon, the stays during this baking process being held in the same position that had been maintained throughout the coating treatment.

If desired, the stays may be taken after the first baking operation is completed and treated to a second dipping, to place a second covering 30 thereon, which may be of such character as to impart a dull finish to the completed stay, or to place a colored coating thereon. During this second treatment, the stays remain in the clamp just as they were for the first treatment, and the surplus coating is allowed to drain off in the same manner as by the first treatment; and the stay is then rebaked. Of course, several coatings may be placed upon the stay in a like manner if desired.

After the stays have been coated and baked in the manner desired, the finger-piece 17 is manipulated to move the blocks 18 and 19 and allow the plates 20 to spread apart, whereupon the stays may be quickly and easily removed from the clamp.

We claim:

1. A device for holding corset steels during the application of a rust-proof composition covering thereto, comprising a frame, means carried by the frame for engaging and clamping the upper tip ends of the steels, a member for holding the lower tip ends of the steels with the body of the steels between said tip ends held in spaced relation and out of surface contact, said member for holding said lower tip ends embodying a series of tapered lugs spaced apart from one another to allow the insertion of the tip end of a steel therebetween and being provided with openings at the points where said steels are inserted to permit of a draining of the surplus composition from the steels, substantially as described.

2. A device for holding corset steels during the application of a rust-proof covering thereto, comprising a frame, means carried by the frame for holding the steels in spaced-apart relation therein and against contact with one another, said holding means comprising a clamping means for one tip end of the stay and along one edge of the frame, and a narrow elongated bar along the opposite end of the frame, a series of lugs on the top of said bar spaced apart from one another, the opposite tip end of the stays resting between said lugs, whereby they are prevented from coming in contact with one another, and said bar being narrower than the width of the stay to provide a space beyond the sides of the bar for allowing the surplus material to drain from the stays, substantially as described.

3. A device for holding corset steels during the application of a rust-proof covering thereto, comprising a frame, and means carried by the frame for holding the steels in spaced-apart relation therein and against contact with one another, said holding means comprising a series of independent clamping members arranged to hold one tip end of a stay between each adjacent clamping member, a single means for moving all of said clamping members into and out of clamping engagement, and a non-clamping support for the opposite tip end of the stay, substantially as described.

SIMON FLORSHEIM.
BENJAMIN F. OREWILER.

Copies of this patent may be obtained for five cents each, by addressing the "Commissioner of Patents, Washington, D. C."